(12) United States Patent
Gomez et al.

(10) Patent No.: US 9,432,222 B2
(45) Date of Patent: Aug. 30, 2016

(54) BROADBAND AMPLIFIER LINEARIZATION USING CAPTURED HISTOGRAM DATA

(71) Applicant: BROADCOM CORPORATION, Irvine, CA (US)

(72) Inventors: Ramon Alejandro Gomez, San Juan Capistrano, CA (US); Bruce Joseph Currivan, Los Altos, CA (US); Lin He, Irvine, CA (US); Thomas Joseph Kolze, Phoenix, AZ (US); Franciscus Maria Leonardus van der Goes, The Hague (NL); Jun Wang, Los Angeles, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/140,887

(22) Filed: Dec. 26, 2013

(65) Prior Publication Data

US 2015/0117508 A1    Apr. 30, 2015

Related U.S. Application Data

(60) Provisional application No. 61/895,384, filed on Oct. 24, 2013, provisional application No. 61/917,472, filed on Dec. 18, 2013.

(51) Int. Cl.
*H04L 25/03* (2006.01)

(52) U.S. Cl.
CPC ... *H04L 25/03057* (2013.01); *H04L 25/03343* (2013.01)

(58) Field of Classification Search
CPC ........ H04B 1/02; H04B 1/04; H04B 1/0475; H04B 15/00; H03F 1/26; H03F 1/3241; H04K 1/02; H04L 25/03; H04L 25/08; H04L 25/49; H04L 27/04; H04L 27/28

USPC ........... 330/10, 136, 149, 151; 370/208; 375/267, 275, 284–285, 295–297, 346; 455/63.1, 67.13, 103–105, 455/114.1–114.3

See application file for complete search history.

(56) References Cited

U.S. PATENT DOCUMENTS

| | | | |
|---|---|---|---|
| 6,717,464 B2 * | 4/2004 | Fudaba | H03F 1/3241 330/136 |
| 7,479,828 B2 * | 1/2009 | Benedict | H03F 1/3247 330/149 |
| 7,741,906 B1 * | 6/2010 | Summerfield | H03F 1/3247 330/149 |

(Continued)

*Primary Examiner* — Sam K Ahn
*Assistant Examiner* — Shawkat M Ali
(74) *Attorney, Agent, or Firm* — Garlick & Markison; Shayne X. Short

(57) ABSTRACT

A transmitter's operation is characterized using components having relatively low cost and low complexity. A device includes comparator(s) that compare a transmitter's analog output to predetermined level(s) to generate count(s) associated with analog output range bin(s). Each of the predetermined levels is associated with a corresponding one of the analog output range bins. A transfer function of the transmitter is generated using the comparison count values associated with the analog output range bin(s). A histogram may be generated from the comparison count values associated with the various analog output range bins. An equalizer is implemented to process data that will be transmitted by the transmitter. The equalizer uses equalizer parameter(s) that are selected based on the characterization of the transmitter (e.g., its transfer function, its histogram, etc.). The equalizer may use default or start up parameters until the transmitter's operation is characterized.

20 Claims, 6 Drawing Sheets

(56) References Cited

U.S. PATENT DOCUMENTS

| | | | |
|---|---|---|---|
| 8,571,497 B1* | 10/2013 | Lin et al. | 455/127.2 |
| 2002/0041208 A1* | 4/2002 | Hamada | H03F 1/3247 330/149 |
| 2005/0009479 A1* | 1/2005 | Braithwaite | 455/114.3 |
| 2009/0129257 A1* | 5/2009 | Maltsev | H03F 1/0205 370/208 |
| 2010/0045375 A1* | 2/2010 | Straussmann | H03M 1/0614 330/149 |
| 2010/0159856 A1* | 6/2010 | Kato | H03F 1/3247 455/114.3 |
| 2010/0164762 A1* | 7/2010 | Datta et al. | 341/118 |
| 2011/0064171 A1* | 3/2011 | Huang et al. | 375/346 |
| 2011/0095819 A1* | 4/2011 | Velazquez | H03F 1/3247 330/149 |
| 2011/0221524 A1* | 9/2011 | Matsubara et al. | 330/149 |
| 2013/0064271 A1* | 3/2013 | van de Beek et al. | 375/219 |

\* cited by examiner

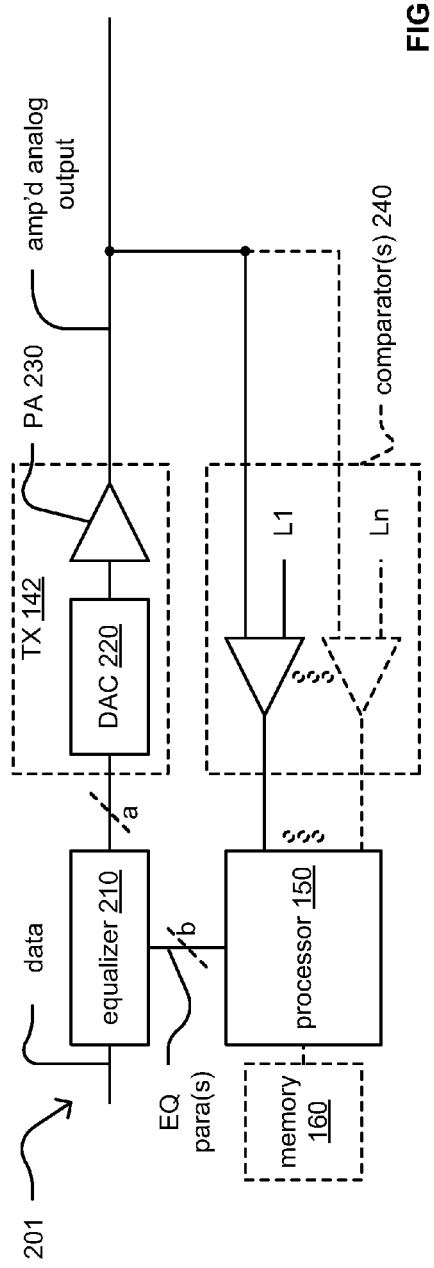
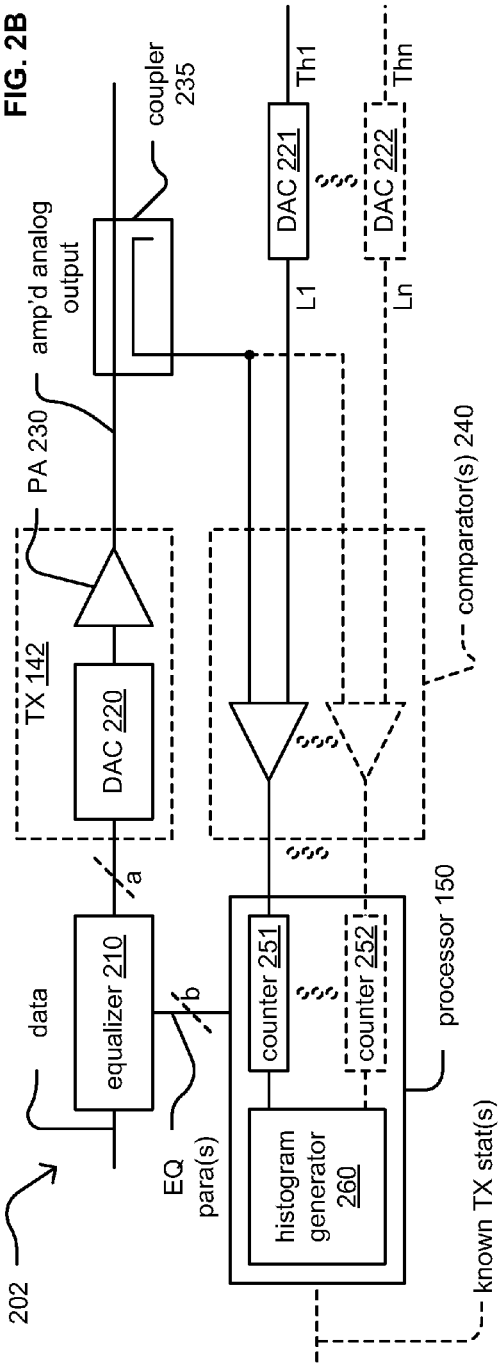
FIG. 2A
FIG. 2B

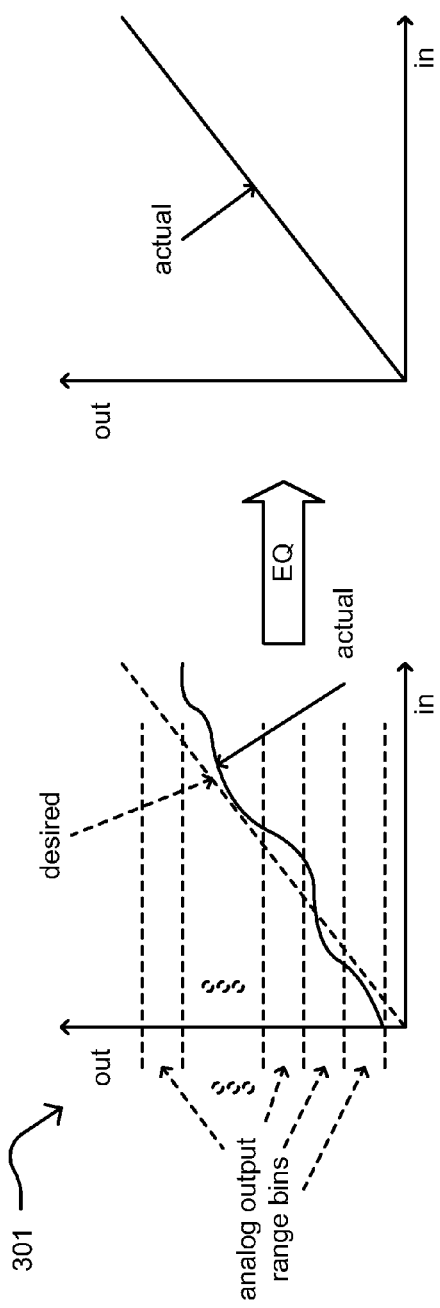
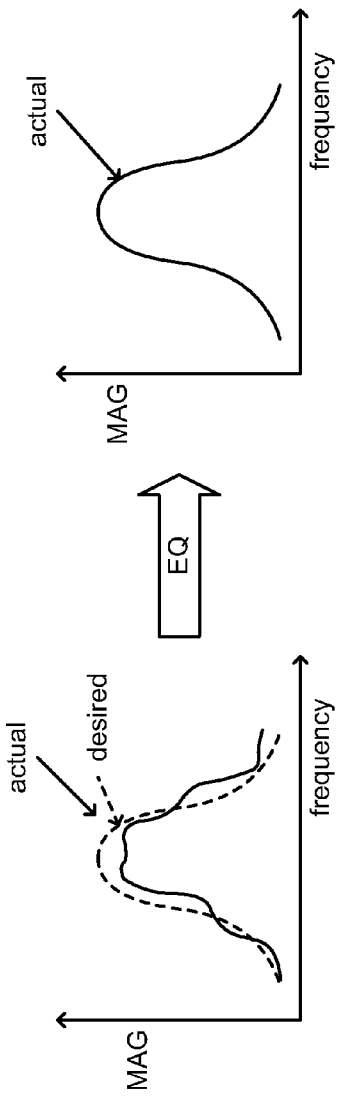
FIG. 3A
FIG. 3B

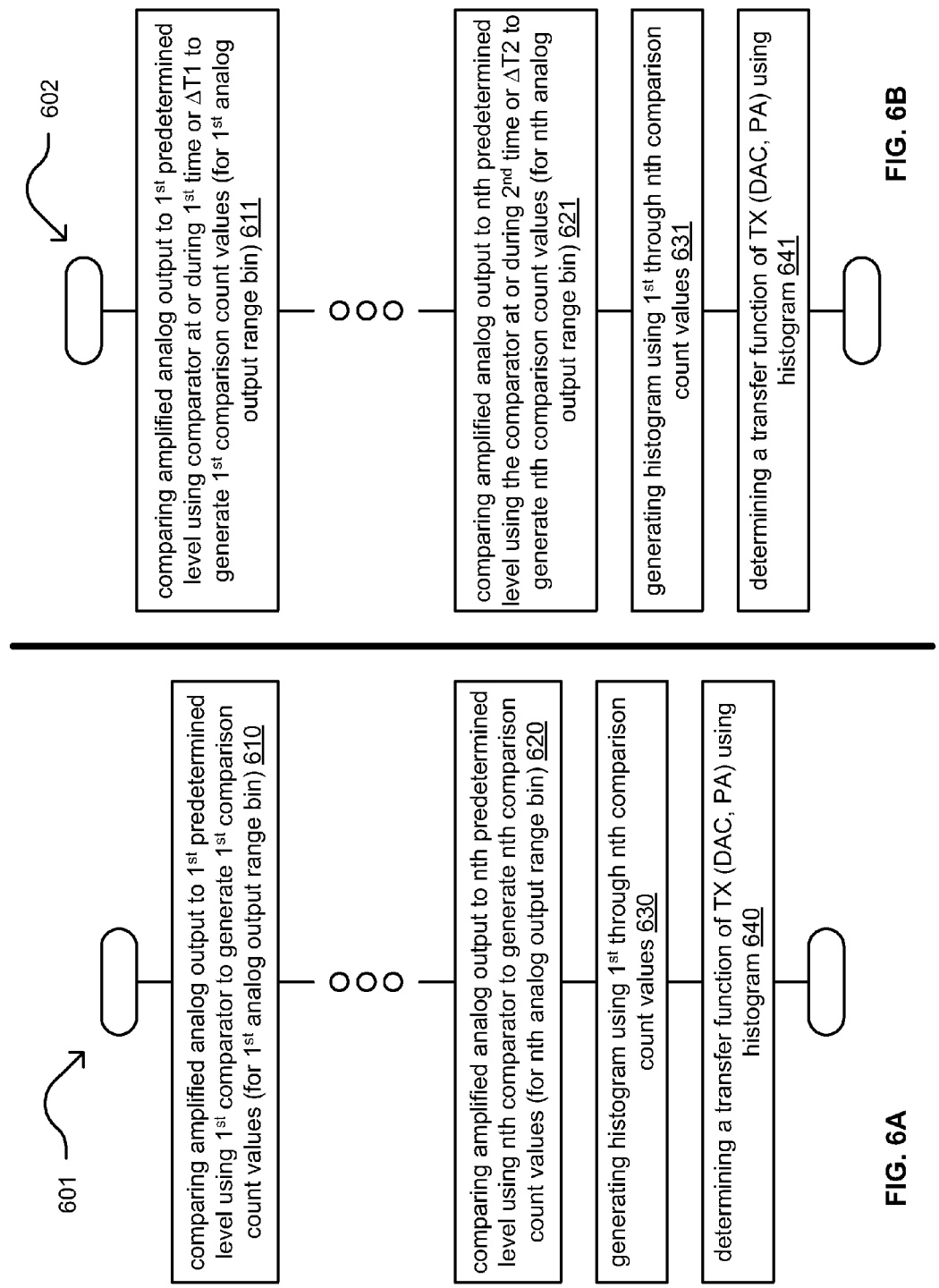

BROADBAND AMPLIFIER LINEARIZATION USING CAPTURED HISTOGRAM DATA

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/895,384, entitled "Spectrum analysis spurs," filed Oct. 24, 2013, pending; and
2. U.S. Provisional Patent Application Ser. No. 61/917,472, entitled "Broadband amplifier linearization using captured histogram data," filed Dec. 18, 2013, pending.

BACKGROUND

1. Technical Field

The present disclosure relates generally to communication systems; and, more particularly, to signal processing within such communication systems.

2. Description of Related Art

Data communication systems have been under continual development for many years. The primary goal within such communication systems is to transmit information successfully between devices. Generally, communications is made from a transmitter of a first communication device to a receiver of a second communication device via a communication pathway between the first and second communication devices that may include one or more communication links. A transmitter may suffer from performance degradation for a number of reasons. A transmitter may include a digital to analog converter (DAC) to perform conversion from the digital domain to the analog domain (e.g., to convert a discrete-time signal to a continuous-time signal suitable for transmission). Also, a transmitter may include a power amplifier (PA) to scale (e.g., amplify) a continuous-time signal output from a DAC. One or both of these components within a transmitter may suffer from distortion. For example, the output signal from a PA may suffer from $3^{rd}$ order distortion.

The present art does not provide an adequate means by which degraded transmitter operation may be corrected. Some prior art has attempted to employ high-fidelity circuits that operate at high-speeds to observe the signals output from a transmitter, but such high-performance (e.g., high-fidelity and high-speed) components are relatively expensive. In addition, such high-performance components can be highly consumptive of power and require highly complex implementation.

BRIEF DESCRIPTION OF THE SEVERAL VIEWS OF THE DRAWINGS

FIG. 2A is a diagram illustrating another example of a communication device.

FIG. 2B is a diagram illustrating another example of a communication device.

FIG. 3A is a diagram illustrating an example of equalization that mitigates or eliminates non-linearity in a transmitter's transfer function.

FIG. 3B is a diagram illustrating an example of equalization that mitigates or eliminates non-linearity in probability density function (PDF) of a transmitter's response.

FIG. 6A is a diagram illustrating an embodiment of a method for execution by one or more communication devices.

FIG. 6B is a diagram illustrating another embodiment of a method for execution by one or more communication devices.

DETAILED DESCRIPTION

Figure 1A:
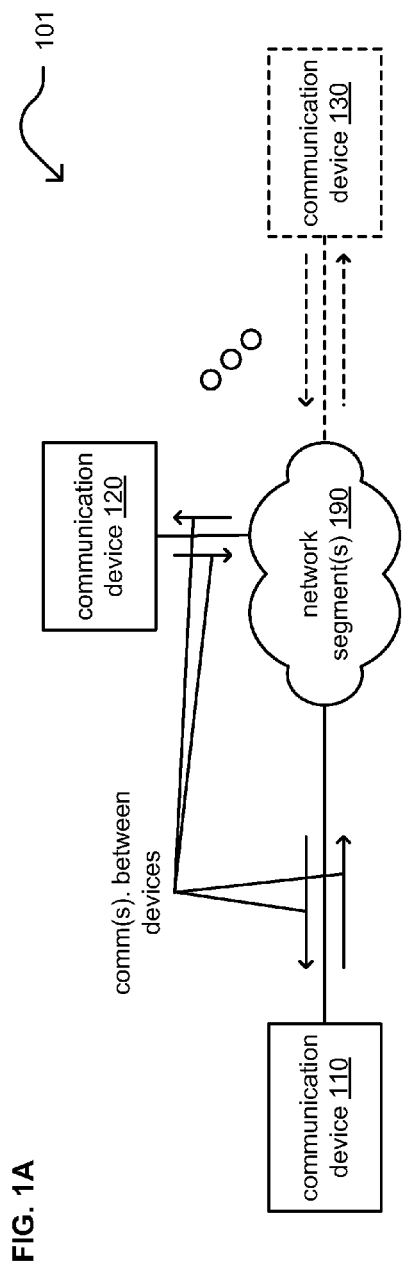
FIG. 1A is a diagram illustrating an embodiment of one or more communication systems.

FIG. 1A is a diagram illustrating an embodiment 101 of one or more communication systems. One or more network segments 190 provide communication inter-connectivity for at least two communication devices 110 and 120. Generally speaking, any desired number of communication devices are included within one or more communication systems (e.g., as shown by communication device 130).

The various communication links within the one or more network segments 190 may be implemented using any of a variety of communication media including communication links implemented as wireless, wired, optical, satellite, microwave, etc. communication links. Also, in some instances, communication links of different types may cooperatively form a connection pathway between any two communication devices. Considering one possible example, a communication pathway between devices 110 and 120 may include some segments of wired communication links and other segments of wireless communication links. Note also that the devices 110-130 may be of a variety of types of devices including stationary devices, mobile devices, portable devices, etc. and may support communications for any of a number of services or service flows including data, telephony, television, Internet, media, synchronization, etc. Note also that the devices 110-130 may be fixed/infrastructure types of devices such as a cable modem termination system (CMTS) or cable headend transmitter in the context of a cable-based system, a base station in the context of the cellular system, an access point (AP) in the context of a wireless local area network (WLAN) system, a satellite tower in the context of a satellite system, a microwave tower in the context of a microsystem, etc.

In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130. Some or all of the various communication devices 110-130 include capability to operate to compensate for nonlinear operation of one or more transmitter components therein. For example, device 110 may be implemented to include a transmitter to generate one or more signals for transmission to one or more of the devices 120-130. The transmitter can include a digital to analog converter (DAC) that is configured to process data to generate analog output and can also include a power amplifier (PA) that is configured to process the analog output to generate amplified analog output for transmission to one or more of the devices 120-130.

The device 110 also includes functionality to perform equalization of data provided to the DAC to mitigate or eliminate performance degradation of the transmitter due to nonlinear operation thereof (e.g., due to nonlinear operation of the DAC, PA, etc.). For example, the device 110 may include an equalizer configured to process the data to be provided to the DAC based on one or more equalizer parameters that characterize operation of the transmitter. The equalizer may initially operate using startup, default, predetermined, last-used, prior-determined, etc. equalizer parameters. Then, as the device operates, one or more comparators are implemented to compare the amplified analog output from the PA to one or more predetermined levels to generate one or more comparison count values associated with one or more analog output range bins. For example, when amplified analog output from the PA compares favorably (e.g., exceeds) a first predetermined level associated with the first analog output range bin, then a count associated with the first analog output range bin is increased. Similarly, when amplified analog output from the PA compares favorably (e.g., exceeds) a second predetermined level associated with the second analog output range bin, then a count associated with the second analog output range bin is increased. A transfer function of the transmitter may be determined using the comparison count values associated with the various analog output range bins. Each analog output range bin corresponds to a sub-range of the analog output range of the communication device (e.g., a first analog output range bin corresponds to a first sub-range of the analog output range of the communication device, a second analog output range bin corresponds to a second sub-range of the analog output range of the communication device, and so on). Note that the various analog output range bins can be of the same size/range (e.g., uniform size/range or substantially uniform same size/range), of different sizes/ranges, etc. Note that a low comparison count value indicates the output of the transmitter of the communication device is, on average, below the predetermined level used to make comparisons for that corresponding analog output range bin. Analogously, a high comparison count value indicates the output of the transmitter of the communication device is, on average, above the predetermined level used to make comparisons for that corresponding analog output range bin.

The device 110 may also include a processor that is configured to determine a transfer function of the transmitter (e.g., including the DAC, PA, etc.) using the one or more comparison count values associated with the one or more analog output range bins. The processor may then modify the one or more equalizer parameters used by the equalizer to perform equalization of data provided to the DAC.

The device includes these one or more comparators, which may be implemented in a comparator bank, to compare the transmitter generated output signals to one or more predetermined levels corresponding to a desired, ideal, or expected output of the transmitter. Based on the difference between the actual and desired output signals, the processor may characterize operation of the transmitter to generate a transfer function of the transmitter. In particular, the processor may determine a transfer function of the DAC and PA of the transmitter and determine one or more equalizer parameters to process the data provided to the DAC to compensate for any nonlinear operation of the DAC and/or PA.

Figure 1B:
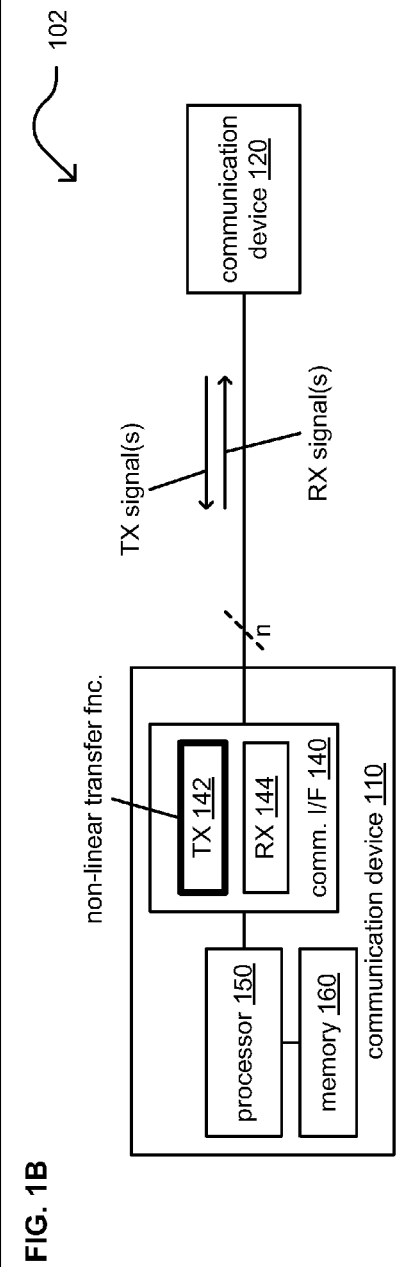
FIG. 1B is a diagram illustrating an example of a communication device operative within one or more communication systems.

FIG. 1B is a diagram illustrating an example 102 of a communication device operative within one or more communication systems. The device 110 includes a communication interface 140 and a processor 150. The communication interface 140 includes functionality of a transmitter 142 and the receiver 144 to support communications with one or more other devices within a communication system. The device 110 may also include memory 160 to store information including equalizer parameters (e.g., including startup, default, predetermined, last-used, prior-determined, etc. equalizer parameters) as well as equalizer parameters that have been modified or generated by the device 110. The memory 160 may also store information corresponding to known transmitter statistics, memory-based behavior of the transmitter, operational history, and/or other information, etc. provided from one or more other devices (e.g., communication device 120) via one or more communication channels.

The memory 160 may also store information related memory effects of the transmitter. For example, the transmitter 142 may behave differently based on different received inputs over time. The transmitter 142 may have a first response to a current input when the transmitter 142 has previously received first prior one or more inputs yet have a second response to that same current input when the transmitter 142 has previously received second prior one or more inputs. One or more components of the transmitter 142 (e.g., DAC and/or PA) may have different memories and behave differently to the same current input when having processed different prior one or more inputs. The operation of the transmitter may be characterized for instantaneous/memoryless operation (e.g., output as a function of only current input) and/or memory-based operation (e.g., output as a function of current input and one or more prior inputs). The processor 150 may be configured to perform a memory-based characterization of the transmitter to determine the transfer function of the transmitter 142. For example, the processor 150 may be configured to perform a memory-based characterization of the transmitter 142 using any known statistics or characteristics of the operation of one or more components of the transmitter 142 (e.g., DAC and/or PA), any statistics associated with the data (e.g., including current input and prior one or more inputs to the transmitter), one or more comparison count values, and/or characterizations over different periods of time (e.g., first memory characterization over first time period, second memory characterization over second time period, etc.).

The memory 160 may also include and store various operational instructions for use by the processor 150 in regards to determining a transfer function of the transmitter 142 as described herein. The memory 160 may also include and store information related to generation or modification of equalizer parameters such as may be used in performing equalization of data provided to a DAC as described herein.

The communication interface 140 is configured to support communications to and from one or more other devices. The transmitter 142 of the communication interface 140 may include one or more elements that operate in a nonlinear manner. For example, the transmitter 142 may include a digital to analog converter (DAC) and power amplifier (PA) such that one or both of the DAC and PA exhibit nonlinear operational characteristics. An equalizer is configured to process data to generate equalized data using one or more equalizer parameters. An equalizer may be implemented as an N-tap equalizer that operates using N filter taps of coefficients to process input data to generate equalized output data (N is a positive integer greater than or equal to 1). The equalizer may be implemented using as any desired type of equalizer operative to perform equalization that can compensate for nonlinear effects. The equalizer may initially use first one or more equalizer parameters and subsequently use second one or more equalizer parameters (e.g., that may be a modified version of the first one or more equalizer parameters). The first one or more equalizer parameters may be startup, default, predetermined, last-used, prior-determined, etc. equalizer parameters. The second one or more equalizer parameters may be selected based on a transfer function of the DAC and PA that is determined based on operation of the device 110.

The DAC is configured to process the equalized data output from the equalizer to generate analog output. The PA is configured to process the analog output to generate amplified analog output for transmission to one or more other devices (e.g., communication device 120). One or more comparators are implemented to compare the amplified analog output from the PA to one or more predetermined levels to generate one or more comparison count values associated with one or more analog output range bins. The device 110 may also include a processor that is configured to determine a transfer function of the transmitter (e.g., including the DAC, PA, etc.) using the one or more comparison count values associated with the one or more analog output range bins. The processor may then modify the one or more equalizer parameters used by the equalizer to perform equalization of data provided to the DAC.

FIG. 2A is a diagram illustrating another example 201 of a communication device. An equalizer 210 is implemented to process data using one or more equalizer parameters. The equalizer 210 may initially perform equalization using first one or more equalizer parameters and subsequently perform equalization using second one or more equalizer parameters that may be a modified version of the first one or more equalizer parameters. The equalizer 210 outputs equalized data to a DAC 220. Output from the equalizer 210 may be output via a multichannel (e.g., of width 'a') pathway or parallel bus. The DAC 220 processes the equalized data to generate analog output that is subsequently processed by a PA 230 that generates amplified analog output. One or more comparators 240 compare the amplified analog output to one or more predetermined levels (shown as L1 through Ln) to generate one or more comparison count values associated with one or more analog output range bins. Note that the DAC 220 and the PA 230 may be implemented within transmitter 142.

Processor 150 is configured to determine a transfer function of the DAC 220 and the PA 230 using the one or more comparison count values. The processor 150 then determines one or more equalizer parameters (e.g., the second one or more equalizer parameters) for use by the equalizer 210. These determined one or more equalizer parameters may be a modified version of the first one or more equalizer parameters employed by the equalizer 210. In addition, processor 150 may also use information stored within memory 160 to determine the one or more equalizer parameters for use by the equalizer 210. For example, any known statistics or characteristics of the operation of the DAC 220 and/or PA 230 may be used for determining the one or more equalizer parameters for use by the equalizer 210.

FIG. 2B is a diagram illustrating another example 202 of a communication device. In this diagram, a coupler 235 samples a portion of the amplified analog output signal and provides it to one or more comparators 240. Also, one or more additional DACs 221 through 222 operate to generate the one or more predetermined levels (shown as L1 through Ln) based on one or more input threshold values (shown as Th1 through Thn). These various thresholds may be the DC or digital levels used to generate the one or more predetermined levels (shown as L1 through Ln) for each one of the thresholds, and predetermined levels may correspond to a respective one of the analog output range bins.

The processor 150 includes one or more counters 251 through 252 that track the comparisons of the couple version of the amplified analog output signal to the one or more predetermined levels. Each one of the counters 251 through 252 may correspond to a respective one of the analog output range bins as well. The processor 150 includes functionality of a histogram generator 260 to generate a histogram that characterizes operation of the transmitter 142 and the DAC 220 and PA 230 therein. The histogram is a characterization of the actual operation of the transmitter 142. The processor 150 then determines one or more equalizer parameters (e.g., the second one or more equalizer parameters) for use by the equalizer 210.

Note that in either of the examples 201 in 202 described above, the equalizer 210 may initially operate using first one or more equalizer parameters and then subsequently operate using second one or more equalizer parameters that are selected based on characterization of transmitter 142 including the DAC 220 and the PA 230 therein. Note also that the determination of the transfer function of the transmitter 142 can be performed during a first period of time during which the equalizer 210 operates using the first one or more equalizer parameters (e.g., default, startup, etc.). During this first period of time, the equalizer 210 may operate using the first one or more equalizer parameters that are based on estimated or prior-known statistics associated with operation of the transmitter 142. After characterization of the operation of the transmitter 142, and after the processor 150 has determined one or more equalizer parameters for use by the equalizer 210 (e.g., which are based on a recent characterization of operation of the transmitter 142), the equalizer 210 may then perform equalization on data to be provided to the transmitter 142 to compensate for nonlinear operation of one or both of the DAC and the PA.

Also, in an implementation of the processor 150 that includes one or more counters 251 through 252, note that multiple counters may be employed such that each one of the counters corresponds to a respective one of the analog output range bins or a single counter may be employed that sweeps across each of the respective analog output range bins. While a single counter implementation may take relatively longer time to generate an accurate characterization of operation of the transmitter 142, there may be instances in which a single counter implementation is preferable to a multiple counter implementation.

FIG. 3A is a diagram illustrating an example 301 of equalization that mitigates or eliminates non-linearity in a transmitter's transfer function. A transmitter may include one or more elements that exhibit nonlinear characteristics during operation. For example, transmitter may include a DAC and PA, and one or both of the DAC and PA may exhibit certain nonlinear operational characteristics. On the left-hand side of the diagram, a desired and an actual transfer function of a transmitter is shown. Ideally, a transmitter will exhibit linear operational characteristics such that when the input provided thereto is scaled up, the output will similarly scale up (and when the input provided to the transmitter is scaled down, the output will similarly scale down) in any predictable manner. However, an actual transmitter may not behave so ideally. Generally, the transfer function of a transmitter may be nonlinear. If the transmitter is properly characterized, then equalization can be performed to data provided to the transmitter to compensate for the nonlinear operation of one or more components within the transmitter.

The output of the transmitter may be partitioned into a number of analog output range bins. A device can include one or more comparators to compare the analog output from the transmitter to one or more predetermined levels to generate one or more comparison count values associated with these analog output range bins. A histogram may be generated using the one or more comparison count values associated with the analog output range bins, and one or more equalizer parameters may be selected to modify data to be provided to the transmitter to effectuate linear operation of the transmitter. For example, after performing appropriate equalization, the input/output transfer function of the transmitter may be transformed to be linear.

FIG. 3B is a diagram illustrating an example 302 of equalization that mitigates or eliminates non-linearity in probability density function (PDF) of a transmitter's response. A transmitter may have a PDF that is approximately Gaussian in nature. The output magnitude of a signal from the transmitter, as a function of frequency, may generally have an approximate Gaussian shape. A broadband transmitter may operate across a relatively broad frequency range while still providing for a linear transfer function. A narrowband transmitter may operate across a relatively narrow range while still providing for linear transfer function. The use of one or more comparators to characterize operation of the transmitter may be performed in a relatively inexpensive and relatively low complexity manner instead of using extremely high-speed and high-fidelity components to characterize operation of the transmitter across a broad frequency range.

However, an actual transmitter may have certain characteristics such that its actual PDF does not perfectly track the shape of a Gaussian distribution. When a transmitter is characterized using any of the various means described herein, equalization can be performed to data provided to the transmitter so that the PDF of the transmitter will more closely track the shape of a Gaussian distribution.

The examples 301 and 302 show characteristics associated with a transmitter's operation such that it may be less than desired or less than ideal in a real, actual implementation. When the transmitter's operation is accurately characterized, such as using one or more comparators and a processor to determine the transfer function of the transmitter, then appropriately selected equalizer parameters may be used to process data that is provided to the transmitter to mitigate or eliminate deleterious effects associated with nonlinear operation of the transmitter. The operation of the transmitter may be characterized in a number of ways including a transfer function that is a function of input/output, a PDF that characterizes operation of the transmitter as a function of frequency, frequency response, etc. When a transmitter is characterized accurately, appropriate equalization can compensate for nonlinear operation of the transmitter.

Figure 4:
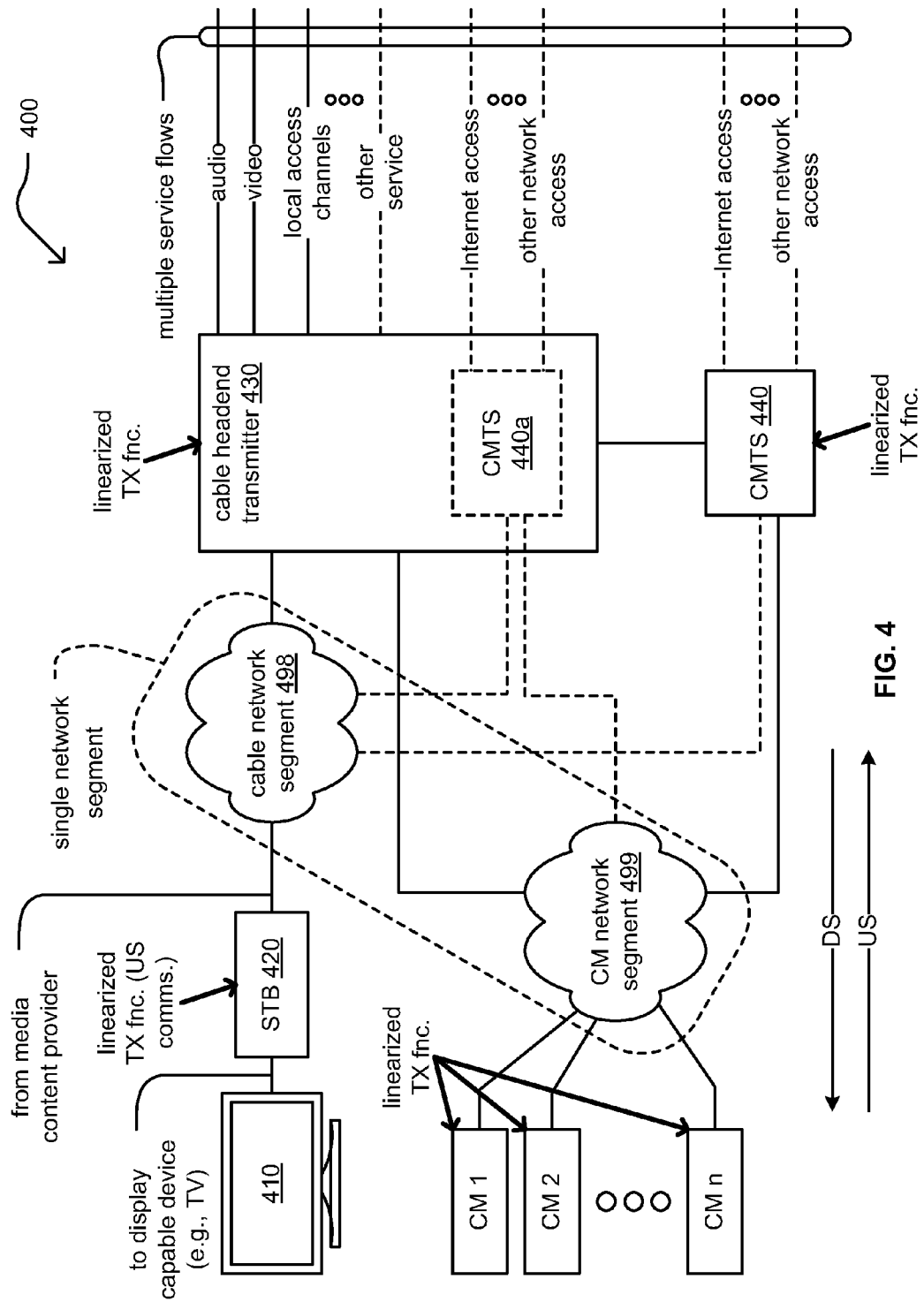
FIG. 4 is a diagram illustrating another embodiment of one or more communication systems.

FIG. 4 is a diagram illustrating another embodiment 400 of one or more communication systems. A cable headend transmitter 430 provides service to a set-top box (STB) 420 via cable network segment 498. The STB 420 provides output to a display capable device 410. The cable headend transmitter 430 can support any of a number of service flows such as audio, video, local access channels, as well as any other service of cable systems. For example, the cable headend transmitter 430 can provide media (e.g., video and/or audio) to the display capable device.

The cable headend transmitter 430 may provide operation of a cable modem termination system (CMTS) 440a. For example, the cable headend transmitter 430 may perform such CMTS functionality, or a CMTS may be implemented separately from the cable headend transmitter 430 (e.g., as shown by reference numeral 440). The CMTS 440 can provide network service (e.g., Internet, other network access, etc.) to any number of cable modems (shown as CM 1, CM 2, and up to CM n) via a cable modem (CM) network segment 499. The cable network segment 498 and the CM network segment 499 may be part of a common network or common networks. The cable modem network segment 499 couples the cable modems 1-n to the CMTS (shown as 440 or 440a). Such a cable system (e.g., cable network segment 498 and/or CM network segment 499) may generally be referred to as a cable plant and may be implemented, at least in part, as a hybrid fiber-coaxial (HFC) network (e.g., including various wired and/or optical fiber communication segments, light sources, light or photo detection components, etc.).

A CMTS 440 (or 440a) is a component that exchanges digital signals with cable modems 1-n on the cable modem network segment 499. Each of the cable modems is coupled to the cable modem network segment 499, and a number of elements may be included within the cable modem network segment 499. For example, routers, splitters, couplers, relays, and amplifiers may be contained within the cable modem network segment 499. Generally speaking, downstream information may be viewed as that which flows from the CMTS 440 to the connected cable modems (e.g., CM 1, CM2, etc.), and upstream information as that which flows from the cable modems to the CMTS 440.

Any of the various communication devices in this diagram may be implemented to include functionality to perform linearized transmitter (TX) function. For example, a cable modem (e.g., CM 1) may be implemented to include an equalizer that is configured to process data to generate equalized data using first one or more equalizer parameters. The cable modem may also be implemented to include a DAC that is configured to process the equalized data to generate analog output as well as a PA that is configured to process the analog output to generate amplified analog output. The cable modem may also be implemented to include one or more comparators configured to compare the amplified analog output to one or more predetermined levels to generate one or more comparison count values associated with one or more analog output range bins. A processor within the cable modem is configured to determine a transfer function of the DAC and the PA using the one or more comparison count values. Then, based on the transfer function of the DAC and the PA, the processor is configured to select second one or more equalizer parameters or modify the first (e.g., original) one or more equalizer parameters used for equalization.

Note that other devices within the diagram may also be implemented to include functionality to perform linearized TX function. For example, CMTS 440 or 440a may also be implemented to effectuate linearized TX function for downstream communication to one or more of the recipient devices, such as the connected cable modems, STB 420, etc. note also that such linearized TX function may be particularly tailored for one or more intended recipients (e.g., first linearized TX function for CM 1, second linearized TX function for CM 2, etc. and nth linearized TX function for STB 420). The STB 420 may also be implemented to include functionality to perform linearized TX function for communications provided downstream to a display capable device, such as TV 410, or for communications provided upstream to the cable head end transmitter 430.

Figures 5A, 5B:
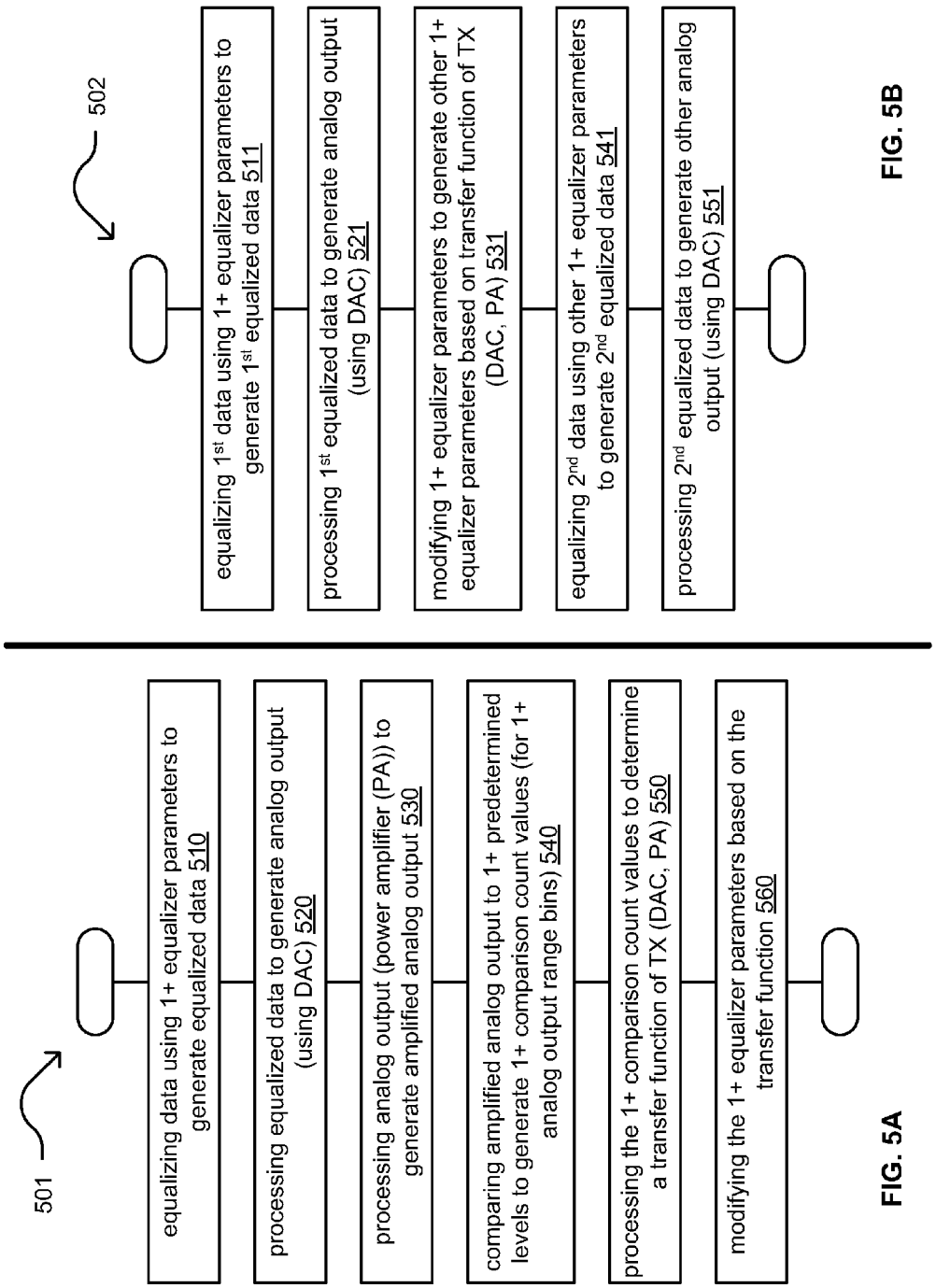
FIG. 5A is a diagram illustrating an embodiment of a method for execution by one or more communication devices.
FIG. 5B is a diagram illustrating another embodiment of a method for execution by one or more communication devices.

FIG. 5A is a diagram illustrating an embodiment of a method 501 for execution by one or more communication devices. The method 501 begins by equalizing data using one or more equalizer parameters to generate equalized data (block 510). These one or more equalizer parameters may be startup, default, initial, etc. equalizer parameters. They may alternatively be based on prior known information associated with transmitter's operation. For example, the one or more equalizer parameters may be selected based on known statistics associated with the transmitter's operation. Then, the method 501 continues by processing the equalized data to generate analog output (block 520). The operations associated with the block 520 may be performed using a digital to analog converter (DAC) implemented within a communication device.

The method 501 continues by processing the analog output to generate amplified analog output (block 530). The operations associated with the block 530 may be performed using a power amplifier (PA) implemented within the communication device. Generally speaking, transmitter within a communication device may include at least a DAC and a PA.

The method 501 continues by comparing the amplified analog output to one or more predetermined levels to generate one or more comparison count values (block 540). Each of the one or more comparison count values may be associated with or based on a corresponding analog output range bin. For example, a first count may be generated that is based on a first analog output range bin, and a second count may be generated that is based on a second analog output range bin. The multiple analog output range bins cooperatively correspond to the output range across which the amplified analog output may vary during operation of the communication device.

The method 501 then operates by processing the one or more comparison count values to determine a transfer function of a transmitter of the communication device (block 550). Such a transmitter may be implemented to include at least a DAC and a PA. Then, the method 501 continues by selecting new equalizer parameters or modifying the one or more equalizer parameters used during operations of the block 510 based on the determined transfer function of the transmitter (block 560). Once characterization of the transmitter has been made, appropriate equalization is performed to subsequent data that is to be provided to the DAC and the PA to generate subsequent amplified analog output.

FIG. 5B is a diagram illustrating another embodiment of a method 502 for execution by one or more communication devices. The method 502 begins by equalizing first data using first one or more equalizer parameters to generate first equalized data (block 511). Then, the method 502 continues by processing the first equalized data to generate analog output (block 521). Operations associated with the block 521 may be performed using a DAC.

The method 502 then operates by selecting second one or more equalizer parameters or modifying the first one or more equalizer parameters used during operations of the block 511 based on the determined transfer function of the transmitter (block 531). The method 502 then continues by equalizing second data using the second one or more equalizer parameters (block 541). The method 502 operates by processing the second equalized data to generate other analog output (block 551). Operations associated with the block 551 may be performed using the DAC that performs operations associated with the block 521.

FIG. 6A is a diagram illustrating an embodiment of a method 601 for execution by one or more communication devices. The method 601 begins by comparing amplified analog output to a first predetermined level using a first comparator to generate first comparison count values (block 610). The method 601 can perform similar operations as described with respect to the block 610 for each of a second, third, fourth, etc. predetermined level. The method 601 continues by comparing the amplified analog output to an nth predetermined level using an nth comparator to generate nth comparison count values (block 620). The variable n is any desired positive integer greater than or equal to 2.

The method 601 continues by generating a histogram using the first through nth comparison count values (block 630). Note that each of the comparison count values corresponds to a respective analog output range bin. The method 601 operates to determine a transfer function of the transmitter within a communication device using the histogram (block 640). The transmitter includes at least a DAC and a PA. The histogram characterizes the operation of the transmitter including any nonlinear characteristics associated with the transfer function of the transmitter.

FIG. 6B is a diagram illustrating another embodiment of a method 602 for execution by one or more communication devices. The method 602 begins by comparing amplified analog output to a first predetermined level using a comparator at or during a first time or period of time (ΔT) to generate first comparison count values (block 611). The method 602 can perform similar operations as described with respect to the block 611 for each of a second, third, fourth, etc. predetermined level. The method 601 continues by comparing the amplified analog output to an nth predetermined level using the comparator (i.e., the same comparator that is used to perform operations associated with the block 611) at or during a second time or period of time (ΔT2) to generate nth comparison count values (block 621). The variable n is any desired positive integer greater than or equal to 2. As with respect to the method 601, within the method 602, the variable n is any desired positive integer greater than or equal to 2.

The method 602 continues by generating a histogram using the first through nth comparison count values (block 631). Note that each of the comparison count values corresponds to a respective analog output range bin. The method 602 operates to determine a transfer function of the transmitter within a communication device using the histogram (block 641). The transmitter includes at least a DAC and a PA. The histogram characterizes the operation of the transmitter including any nonlinear characteristics associated with the transfer function of the transmitter.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
an equalizer configured to process data to generate equalized data using one or more equalizer parameters that compensate for nonlinear operation of analog circuitry of the communication device;
a digital to analog converter (DAC) configured to process the equalized data to generate analog output;
a power amplifier (PA) configured to amplify the analog output to generate amplified analog output;
one or more comparators configured to perform comparisons of the amplified analog output with predetermined analog output range bins;
one or more counters configured to count, based on the comparisons, occurrences of the amplified analog output exceeding levels associated with the predetermined analog output range bins to generate comparison count values associated with the predetermined analog output range bins; and
a processor configured to:
determine a transfer function of the DAC and the PA based on the comparison count values; and
modify the one or more equalizer parameters based on the transfer function of the DAC and the PA to generate modified one or more equalizer parameters.

2. The communication device of claim 1 further comprising:
the equalizer configured to process other data to generate other equalized data using the modified one or more equalizer parameters to compensate for nonlinear operation of at least one of the DAC or the PA;
the DAC configured to process the other equalized data to generate other analog output; and
the PA configured to process the other analog output to generate other amplified analog output.

3. The communication device of claim 1, wherein the processor is further configured to:
perform a memory-based characterization of at least one of the DAC or the PA using statistics associated with the data that undergoes processing to generate the equalized data and the comparison count values to determine the transfer function of the DAC and the PA.

4. The communication device of claim 1 further comprising:
the one or more comparators includes:
a first comparator configured to perform first comparisons of the amplified analog output to a first predetermined level associated with a first predetermined analog output range bin; and
a second comparator configured to perform second comparisons of the amplified analog output to a second predetermined level associated with a second predetermined analog output range bin;
the one or more counters includes:
a first counter configured to count, based on the first comparisons, first occurrences of the amplified analog output exceeding the first predetermined level associated with the first predetermined analog output range bin to generate a first comparison count value, wherein the first comparison count value corresponds to a first portion of the transfer function of the DAC and the PA associated with the first predetermined analog output range bin; and
a second counter configured to count, based on the second comparisons, second occurrences of the amplified analog output exceeding the second predetermined level associated with the second predetermined analog output range bin to generate a second comparison count value, wherein the second comparison count value corresponds to a second portion of the transfer function of the DAC and the PA associated with the second predetermined analog output range bin; and
the processor configured to:
generate a histogram that includes the first comparison count value and the second comparison count value; and
determine the transfer function of the DAC and the PA based on the histogram.

5. The communication device of claim 1 further comprising:
the one or more comparators includes a single comparator configured to:
perform first comparisons of the amplified analog output to a first predetermined level associated with a first predetermined analog output range bin during a first period of time; and
perform second comparisons of the amplified analog output to a second predetermined level associated with a second predetermined analog output range bin during a second period of time;
the one or more counters includes a single counter configured to:
count, based on the first comparisons, first occurrences of the amplified analog output exceeding the first predetermined level associated with the first predetermined analog output range bin during the first period of time to generate a first comparison count value, wherein the first comparison count value corresponds to a first portion of the transfer function of the DAC and the PA associated with the first predetermined analog output range bin; and
count, based on the second comparisons, second occurrences of the amplified analog output exceeding the second predetermined level associated with the second predetermined analog output range bin during the second period of time to generate a second comparison count value, wherein the second comparison count value corresponds to a second portion of the transfer function of the DAC and the PA associated with the second predetermined analog output range bin; and
the processor configured to:
generate a histogram that includes the first comparison count value and the second comparison count value; and
determine the transfer function of the DAC and the PA based on the histogram.

6. The communication device of claim 1 further comprising:
a first other DAC configured to process a first threshold to generate a first predetermined level associated with a first predetermined analog output range bin;
a second other DAC configured to process a second threshold to generate a second predetermined level associated with a second predetermined analog output range bin;
the one or more comparators includes:
a first comparator configured to perform first comparisons of the amplified analog output to the first predetermined level associated with the first predetermined analog output range bin; and
a second comparator configured to perform second comparisons of the amplified analog output to the second predetermined level associated with the second predetermined analog output range bin;
the one or more counters includes:
a first counter configured to count, based on the first comparisons, first occurrences of the amplified analog output exceeding the first predetermined level associated with the first predetermined analog output range bin to generate a first comparison count value, wherein the first comparison count value corresponds to a first portion of the transfer function of the DAC and the PA associated with the first predetermined analog output range bin; and
a second counter configured to count, based on the second comparisons, second occurrences of the amplified analog output exceeding the second predetermined level associated with the second predetermined analog output range bin to generate a second comparison count value, wherein the second comparison count value corresponds to a second portion of the transfer function of the DAC and the PA associated with the second predetermined analog output range bin; and
the processor configured to:
generate a histogram that includes the first comparison count value and the second comparison count value; and
determine the transfer function of the DAC and the PA based on the histogram.

7. The communication device of claim 1 further comprising:
a communication interface configured to transmit the amplified analog output via one or more communication channels.

8. The communication device of claim 1, wherein the communication device is operative within at least one of a satellite communication system, a wireless communication system, a wired communication system, or a mobile communication system.

9. A communication device comprising:
an equalizer configured to process data to generate equalized data using one or more equalizer parameters that compensate for nonlinear operation of analog circuitry of the communication device;
a digital to analog converter (DAC) configured to process the equalized data to generate analog output;
a power amplifier (PA) configured to amplify the analog output to generate amplified analog output;
a communication interface configured to transmit the amplified analog output;
a first comparator configured to perform first comparisons of the amplified analog output to a first predetermined level associated with a first predetermined analog output range bin;
a second comparator configured to perform second comparisons of the amplified analog output to a second predetermined level associated with a second predetermined analog output range bin; a first counter configured to count, based on the first comparisons, first occurrences of the amplified analog output exceeding the first predetermined level associated with the first predetermined analog output range bin to generate a first comparison count value;
a second counter configured to count, based on the second comparisons, second occurrences of the amplified analog output exceeding the second predetermined level associated with the second predetermined analog output range bin to generate a second comparison count value; and
a processor configured to:
generate a histogram that includes the first comparison count value and the second comparison count value;
determine a transfer function of the DAC and the PA based on the histogram; and
modify the one or more equalizer parameters based on the transfer function of the DAC and the PA to generate modified one or more equalizer parameters.

10. The communication device of claim 9 further comprising:
the equalizer configured to process other data to generate other equalized data using the modified one or more equalizer parameters to compensate for nonlinear operation of at least one of the DAC or the PA;
the DAC configured to process the other equalized data to generate other analog output;
the PA configured to process the other analog output to generate other amplified analog output; and
the communication interface configured to transmit the other amplified analog output.

11. The communication device of claim 9 further comprising:
the processor configured to perform a memory-based characterization of the DAC and the PA using statistics associated with the data that undergoes processing to generate the equalized data and the histogram to determine the transfer function of the DAC and the PA;
the equalizer configured to process other data to generate other equalized data using the modified one or more equalizer parameters to compensate for nonlinear operation of at least one of the DAC or the PA;
the DAC configured to process the other equalized data to generate other analog output;
the PA configured to process the other analog output to generate other amplified analog output; and
the communication interface configured to transmit the other amplified analog output.

12. The communication device of claim 9 further comprising:
a first other DAC configured to process a first threshold to generate the first predetermined level; and
a second other DAC configured to process a second threshold to generate the second predetermined level.

13. The communication device of claim 9, wherein the communication device is operative within at least one of a satellite communication system, a wireless communication system, a wired communication system, or a mobile communication system.

14. A method for execution by a communication device, the method comprising:
equalizing data using one or more equalizer parameters that compensate for nonlinear operation of analog circuitry of the communication device to generate equalized data;
operating a digital to analog converter (DAC) to process the equalized data to generate analog output;
operating a power amplifier (PA) to amplify the analog output to generate amplified analog output;
performing comparisons of the amplified analog output with predetermined analog output range bins; counting, based on the comparisons, occurrences of the amplified analog output exceeding levels associated with the predetermined analog output range bins to generate comparison count values associated with the predetermined analog output range bins;
processing the comparison count values to determine a transfer function of the DAC and the PA; and
modifying the one or more equalizer parameters based on the transfer function of the DAC and the PA to generate modified one or more equalizer parameters.

15. The method of claim 14 further comprising:
equalizing other data using the modified one or more equalizer parameters to generate other equalized data to compensate for nonlinear operation of at least one of the DAC or the PA;
operating the DAC to process the other equalized data to generate other analog output; and
operating the PA to process the other analog output then other amplified analog output.

16. The method of claim 14 further comprising:
performing first comparisons of the amplified analog output to a first predetermined level associated with a first predetermined analog output range bin;
performing second comparisons of the amplified analog output to a second predetermined level associated with a second predetermined analog output range bin;
counting, based on the first comparisons, first occurrences of the amplified analog output exceeding the first predetermined level associated with the first predetermined analog output range bin to generate a first comparison count value, wherein the first comparison count value corresponds to a first portion of the transfer function of the DAC and the PA associated with the first predetermined analog output range bin;
counting, based on the second comparisons, second occurrences of the amplified analog output exceeding the second predetermined level associated with the second predetermined analog output range bin to generate a second comparison count value, wherein the second comparison count value corresponds to a second portion of the transfer function of the DAC and the PA associated with the second predetermined analog output range bin;
generating a histogram that includes the first comparison count value and the second comparison count value; and
determining the transfer function of the DAC and the PA based on the histogram.

17. The method of claim 14 further comprising:
performing first comparisons of the amplified analog output to a first predetermined level associated with a first predetermined analog output range bin during a first period of time;
performing second comparisons of the amplified analog output to a second predetermined level associated with a second predetermined analog output range bin during a second period of time; counting, based on the first comparisons, first occurrences of the amplified analog output exceeding the first predetermined level associated with the first predetermined analog output range bin during the first period of time to generate a first comparison count value, wherein the first comparison count value corresponds to a first portion of the transfer function of the DAC and the PA associated with the first predetermined analog output range bin;
counting, based on the second comparisons, second occurrences of the amplified analog output exceeding the second predetermined level associated with the second predetermined analog output range bin during the second period of time to generate a second comparison count value, wherein the second comparison count value corresponds to a second portion of the transfer function of the DAC and the PA associated with the second predetermined analog output range bin; and
generating a histogram that includes the first comparison count value and the second comparison count value; and
determining the transfer function of the DAC and the PA based on the histogram.

18. The method of claim 14 further comprising:
operating a first other DAC configured to process a first threshold to generate a first predetermined level associated with a first predetermined analog output range bin;
operating a second other DAC configured to process a second threshold to generate a second predetermined level associated with a second predetermined analog output range bin;
performing first comparisons of the amplified analog output to the first predetermined level associated with the first predetermined analog output range bin;
performing second comparisons of the amplified analog output to the second predetermined level associated with the second predetermined analog output range bin;
counting, based on the first comparisons, first occurrences of the amplified analog output exceeding the first predetermined level associated with the first predetermined analog output range bin to generate a first comparison count value, wherein the first comparison count value corresponds to a first portion of the transfer function of the DAC and the PA associated with the first predetermined analog output range bin;
counting, based on the second comparisons, second occurrences of the amplified analog output exceeding the second predetermined level associated with the second predetermined analog output range bin to generate a second comparison count value, wherein the second comparison count value corresponds to a second portion of the transfer function of the DAC and the PA associated with the second predetermined analog output range bin; and
generating a histogram that includes the first comparison count value and the second comparison count value; and
determining the transfer function of the DAC and the PA based on the histogram.

19. The method of claim 14 further comprising:
via a communication interface of the communication device, transmitting the amplified analog output via one or more communication channels.

20. The method of claim 14, wherein the communication device is operative within at least one of a satellite communication system, a wireless communication system, a wired communication system, or a mobile communication system.

* * * * *